Oct. 11, 1966  B. A. WITTKUHNS  3,277,697
VIBRATION TESTING MACHINE WITH CONTINUOUSLY
ADJUSTABLE AMPLITUDE AND FREQUENCY
Filed July 6, 1965  5 Sheets-Sheet 1

INVENTOR.
BRUNO A. WITTKUHNS
BY Richard von K. Bruns
Atty.

INVENTOR.
BRUNO A. WITTKUHNS
BY

Oct. 11, 1966 B. A. WITTKUHNS 3,277,697
VIBRATION TESTING MACHINE WITH CONTINUOUSLY
ADJUSTABLE AMPLITUDE AND FREQUENCY
Filed July 6, 1965 5 Sheets-Sheet 4

INVENTOR.
BRUNO A. WITTKUHNS
BY

INVENTOR.
BRUNO A. WITTKUHNS

United States Patent Office 3,277,697
Patented Oct. 11, 1966

3,277,697
VIBRATION TESTING MACHINE WITH CONTINUOUSLY ADJUSTABLE AMPLITUDE AND FREQUENCY
Bruno A. Wittkuhns, 98 W. Genesee St., Skaneateles, N.Y.
Filed July 6, 1965, Ser. No. 471,503
19 Claims. (Cl. 73—71.6)

This invention is a continuation-in-part of co-pending application Ser. No. 364,125, filed May 1, 1964, and now abandoned by the same inventor, and relates to a vibration testing machine and more particularly to such a machine in which the amplitude of vibration can be adjusted while the machine is in operation.

In the testing of articles particularly susceptible to damage or malfunction which may be caused by a resonance condition it is desirable to provide a testing machine in which the amplitude, as well as the frequency, of vibration can be continuously and gradually varied while the machine is running. In any such machine that is motor driven the variations in the frequency of vibration may be obtained by the provision of a variable speed motor.

Vibration testing machines have their largest field of use as simulators of transportation conditions to which packaged or unpackaged equipment is exposed. One of the commonest types has a vibration table supported on legs under the four corners of the table, each leg having a journalled connection with an eccentric portion on one of two shafts, one shaft under each end of the table. Depending on how the legs are secured to the table, what the drive arrangement is for rotating the shafts, and what stabilizing or guide means are used for the table, various types and combinations of table motion can be produced.

The eccentric portions of the shafts on which the legs are supported may have a fixed excursion or throw of one inch maximum, for example, and for this dimension the shaft speeds must be limited to a range within 100 to 300 r.p.m. Higher speeds cannot be used because the G forces developed at higher speeds for the same total excursion increase with the square of the frequency and become injurious to the test article as well as the machine.

For efficient testing, however, it has long been recognized that higher frequencies must be used and for these higher frequencies the amplitude of the vibration must be reduced.

Some machines have been built which have double eccentrics, one eccentric housed within another in such a way that by rotating one on the other the eccentricity can be changed, from 0 to a maximum of one inch, for example. Four double eccentrics of this type would be necessary to operate a vertical linear machine, and the amplitude adjustment usually can only be made when the machine is at a standstill. A separate adjustment has to be made at each of the four groups of eccentrics.

The great disadvantage of this type of double eccentric is of the high cost. The internal and external eccentrics have to be made with great precision and of specially selected materials to provide for a reasonably long life.

At least one attempt has been made to make a machine using double eccentrics and providing means for varying the resultant eccentricity thereof while the machine is running. In addition to other defects, such a machine was prohibitive in cost except to a very few large and well funded laboratories.

Also available are hydraulic machines and electromagnetic shakers providing amplitudes variable while the machine is running. These machines are also very expensive to make.

The machine of the present invention employs eccentrics at the four corners of the table but the pairs of eccentrics at the corners are not one within the other but are separated by a finite distance so that a total of four shafts are used to operate the machine and each pair of eccentrics is coupled in series. All the eccentrics are alike and the four upper eccentrics are driven in phase, as are the four lower ones.

The transmission drive means for rotating the four shafts includes a so-called "differential" between the means for driving the upper shafts and the means for driving the lower shafts so that the phase of one set of eccentrics may be changed with respect to the other set of eccentrics in such a manner that their respective amplitudes are added or subtracted. Any of many known forms of differential may be used and two are shown and described herein. The important aspect is that the resultant amplitude of the pairs of eccentrics which are connected in series can be changed at any time whether the machine is running or not.

The most frequently used type of vibrating machine is that in which the vibration is in a substantially linear vertical path and this type of machine is first hereinafter described. Machines in which the vibration is in a substantially linear horizontal path or in a circular or elliptical path are also known and means for obtaining these other types of vibration using the same principle are also herein described.

The principal object of the present invention, accordingly, is to provide a vibration testing machine which may be constructed at a reasonable cost and in which the amplitude of vibration may be continuously and gradually varied over a pre-selected range while the machine is in operation.

Another important object is the provision of a machine which may be economically constructed and in which the amplitude of vibration may be steplessly varied by purely mechanical means.

A further object is the provision of means for vibrating a testing table mounted for linear vibration, which vibrating means is adjustable for frequency and amplitude of vibration without interrupting the vibration of the table.

A still further object is to provide a vibration testing machine in which both the amplitude and frequency of vibration are continuously adjustable while the machine is operating so as to continuously control the total resultant forces to which tested articles are subjected.

Other objects and advantages will become apparent from the following description taken in conjunction with the accompanying drawings, in which.

Referring first to FIGURES 1–5, a vertical linear testing machine 10 embodying the invention is shown having a base 11, a movable table 12 supported above the base, and a variable speed motor 13 secured to the base under the table. A crank handle 14 is provided at the front of the machine (FIG. 1) connected to the motor for regulating the speed thereof.

Figure 1:
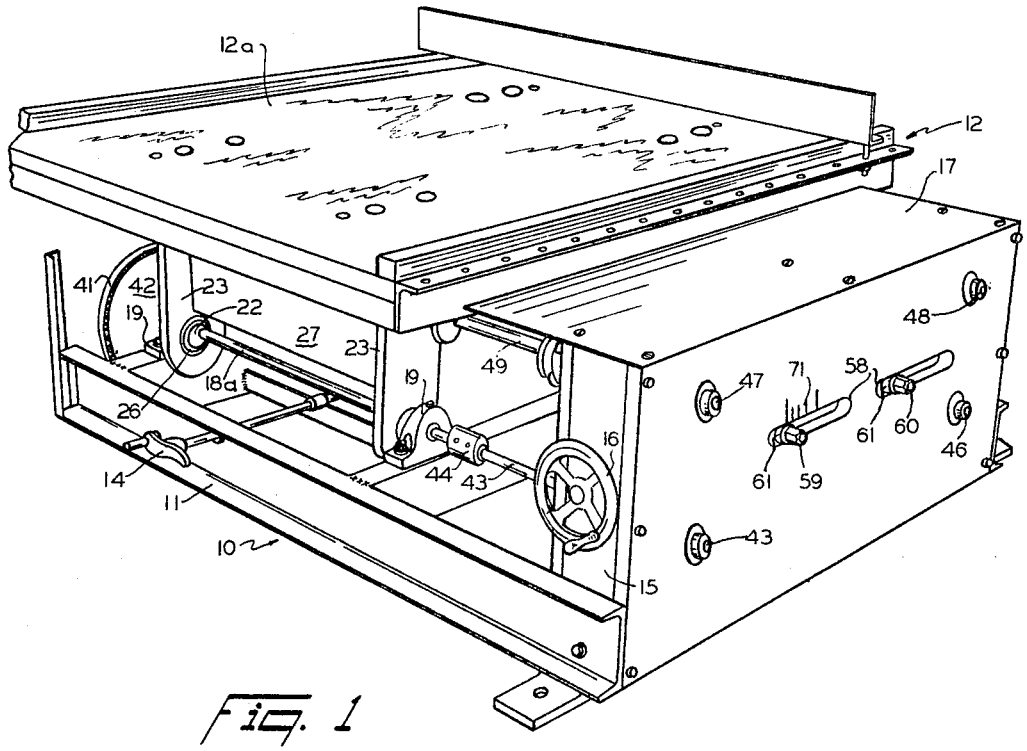
FIGURE 1 is a perspective view of a testing machine arranged for vertical linear testing according to the invention, as viewed from the right front.

A transmission housing 15 is mounted on base 11 at the right side in FIGURE 1 and a hand wheel 16 is provided at the front of the housing for regulating the amplitude of vibration of table 12 as hereinafter described. Suitable shielding, not shown, is provided for enclosing the moving parts of the machine beneath table 12.

Figure 3:
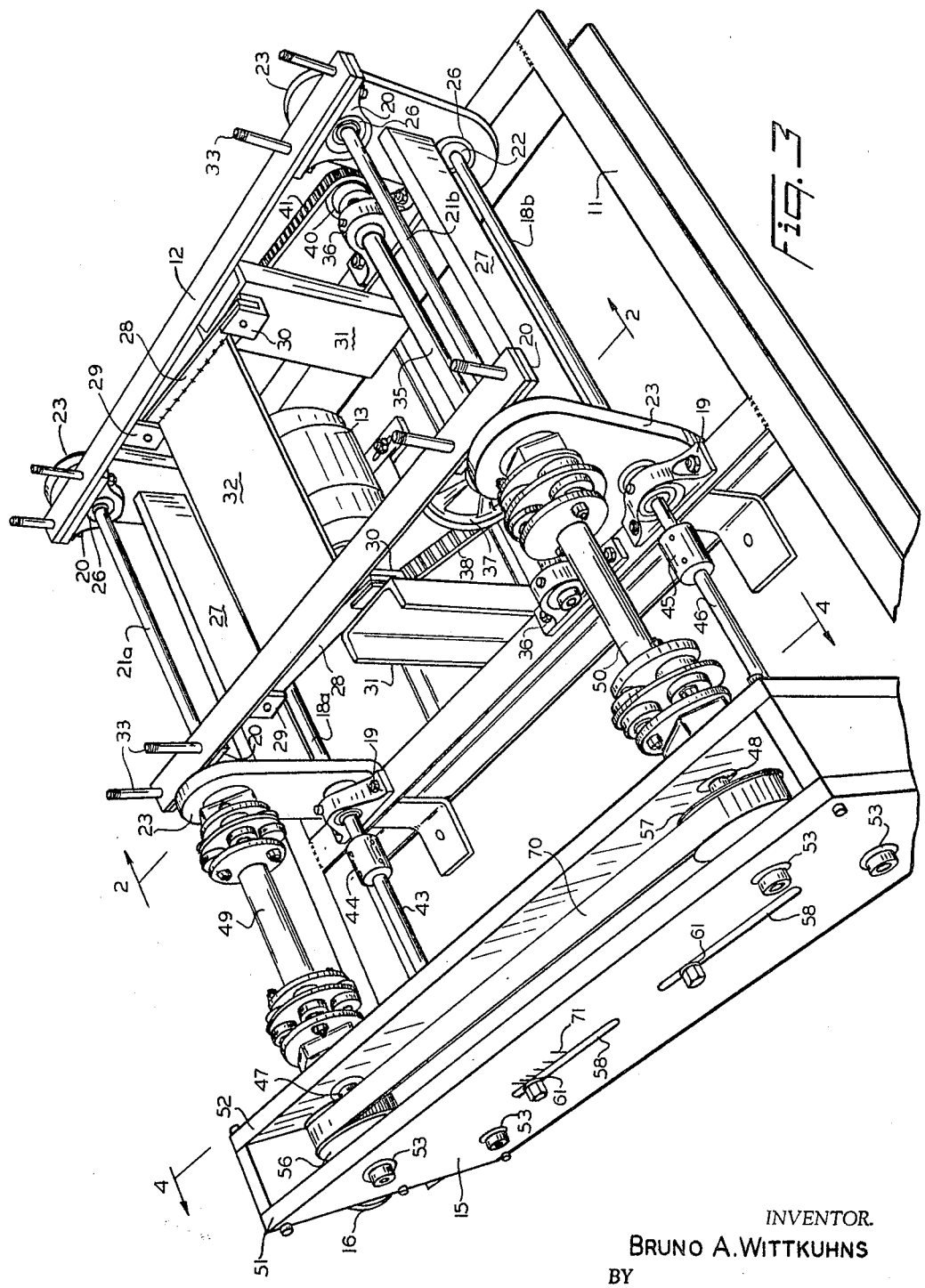
FIGURE 3 is a fragmentary perspective view thereof with the table top removed and as viewed from the right rear.

Referring more particularly to FIGURE 3, in which the table top 12a and coupling cover plate 17 are omitted for clarity, two parallel shafts 18a and 18b are rotatably mounted on frame 11 in suitable pillow blocks or journals 19 under the front and rear ends of the table 12. Similarly mounted in journals 20 secured to the bottom of the table are front and rear shafts 21a and 21b directly above the shafts 18a and 18b.

Each of the shafts 18a, 18b, 21a and 21b has an eccentric 22 secured at each end thereof so as to provide a pair of eccentrics, one above the other, substantially at and below the four corners of the table. A vertically extending leg or link 23 connects each pair of eccentrics 22—22, each eccentric being rotatably secured by snap rings 24, 25 (FIG. 5) within a roller bearing 26 similarly secured in link 23. The pairs of links 23 at the front and back of table 20 are respectively interconnected by a cross member 27 bolted at each end to the links.

A substantially horizontally disposed stabilizing link 28 at each side edge of table 20 is pivotally secured at one end to a clip 29 welded to the bottom of table 20 and at the other end to a similar clip 30 on a post 31 welded to base 11. A connecting plate 32 is welded at each end to a link 28 for squaring and strengthening the stabilizing mechanism which guides table 20 in a substantially linear vertical path.

Table 12 is provided with shouldered stud screws 33 by which table top 12a may be bolted to the table.

A counter-shaft 35 is journalled on base 11 in pillow blocks 36, and a toothed pulley 37 secured on one end of the shaft is connected by an endless toothed belt 38 to a toothed drive pulley 39 (FIG. 2) on the drive shaft of motor 13. At the other end of shaft 35 a drive sprocket 40 is connected by an endless chain 41 with a driven sprocket 42 (FIG. 1) secured on the outer end of shaft 18a.

Rotation of shaft 18a, as it is driven by motor 13, is transmitted to a shaft 43 journalled in the transmission housing 15. Shafts 18a and 43, in prolongation thereof, are joined by a coupling 44 and a similar coupling 45 joins shaft 18b to a shaft 46 in prolongation thereof and journalled in housing 15. Transmission shafts 47 and 48, also journalled in housing 15, above shafts 43 and 46, are connected to shafts 21a and 21b, substantially in prolongation thereof, by conventional flexible coupling assemblies 49 and 50.

Figure 4:
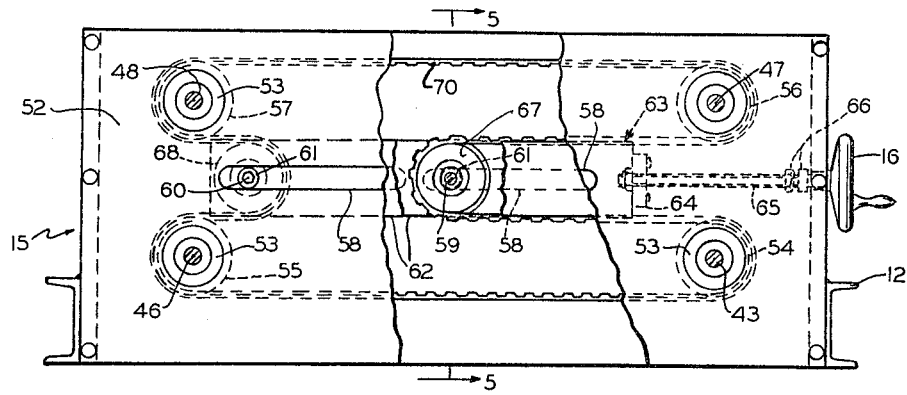
FIGURE 4 is a fragmentary sectional view of the transmission and differential portion of the machine of FIGURE 1 taken on the line 4—4 of FIGURE 3, and with a portion of the housing broken away for clarity.
Figure 5:
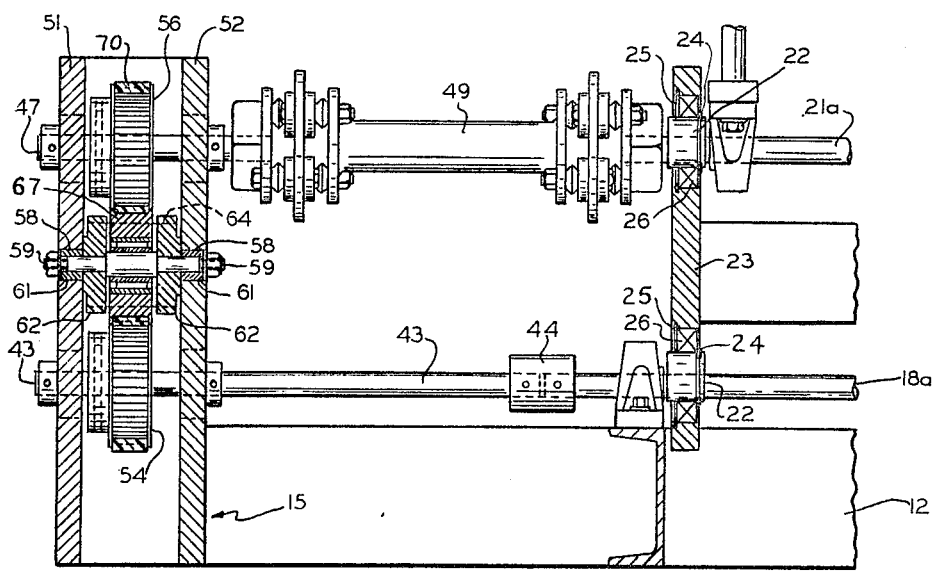
FIGURE 5 is an enlarged fragmentary sectional view taken on the line 5—5 of FIGURE 4, the vertical leg also being shown in section for clarity.

Referring more particularly to FIGURES 4 and 5, the sidewalls 51 and 52 of housing 15 are provided with appropriate roller bearings 53 for the transmission shafts 43, 46, 47 and 48 and the shafts have secured thereon, respectively, toothed transmission pulleys 54, 55, 56 and 57, all of the same size and like number of teeth. The housing sidewalls 51 and 52 are each provided with two aligned, horizontally extending slots 58 and short differential shafts 59 and 60 are rotatably and slidably mounted across the housing in opposed pairs of slots. Shafts 59 and 60 are provided with rollers 61 rotatably engaged in the slots 58 and pass through suitable bores in the side plates 62, 62 of a sliding differential carriage 63 having an end plate 64. The end plate is threadedly engaged with a worm 65 connected through a fixed collar 66 with hand wheel 16 for sliding carriage 63 with its shafts 59 and 60 back and forth in th slots 58.

On shafts 59 and 60, within housing 15 and between the carriage side plates 62, 62, differential pulleys 67 and 68, respectively, are rotatably mounted, the shafts being shouldered for axially securing them between carriage side plates 62—62. An endless toothed timing belt 70 passes around and engages the toothed transmission pulleys 54, 55, 56 and 57. Oppositely and inwardly extending bights in belt 70 between the upper and lower pulleys pass, each in a reverse curve, around one of the differential pulleys 67 and 68 as shown.

A scale 71 is provided on housing side plate 51 for registration with shaft 59 as carriage 63 slides along the slots 58.

In operation, the table 12 is supported on links 23 and the stabilizing links 28 prevent the movement of the table except in a vertical, substantially linear path. As shaft 18a is rotated by motor 13 as described above, transmission shaft 43, being coupled thereto, is rotated as is the toothed pulley 54 thereon which is operably engaged with belt 70.

Pulley 55 secured on transmission shaft 46 is so oriented when coupled to shaft 18b that when the pulley is rotated by the toothed belt 70 the eccentrics 22 on the coupled shaft 18b rotate in phase with the eccentrics 22 on the shaft 18a. Belt 70 is also engaged with pulleys 56 and 57 on transmission shafts 47 and 48 and in the coupling of these latter shafts to shafts 21a and 21b care is taken to register the shafts so that, as pulleys 56 and 57 rotate, the eccentrics on shafts 21a and 21b also rotate in phase. It will be apparent that the eccentrics 22 on all four table-vibrating shafts rotate at the same speed as determined by the speed of the motor 13.

The belt 70 also passes in reverse curves around the pulleys 67 and 68 on shafts 59 and 60 carried in carriage 63, and the carriage is movable back and forth as the hand wheel 16 is turned. If shaft 43 were held still it will be apparent that, as carriage 63 is moved to the right as seen in FIGURE 4, the upper shafts 47 and 48 will be turned counter-clockwise by the engagement of the belt teeth with the teeth of pulleys 56 and 57. It will also be apparent that the same change in phase between upper and lower shafts will take place if the shafts are rotating. Pulleys 56 and 57 are connected by the upper run of belt 70, however, so that the two upper shafts remain always in phase as do the lower shafts which are constantly connected by the bottom run of belt 70.

Since the movement of carriage 63 back and forth results in a phase change between the pulleys connected by the upper run of belt 70 and those connected by the bottom run, it will be understood that the carriage pulleys 67 and 68 have a differential connection through belt 70 with the transmission parts associated with the upper and lower runs of the belt. Belt 70, carriage 63 and its associated parts are therefore herein defined as "differential" parts. Comparing this differential arrangement with a motor car differential, pulley 54 on its drive shaft 43 is equated to the car motor driven drive shaft. Pulley 56 on the driven shaft 47 may be equated to the car half-axle driving one wheel and the carriage 63 with its pulleys 67 and 68 may be equated to the other car half-axle driving the other wheel. The function of the parts, however, is different. Carriage 63 has a linear motion and is moved only to orient the differential so as to change the phase relation between the other parts.

Figure 2:
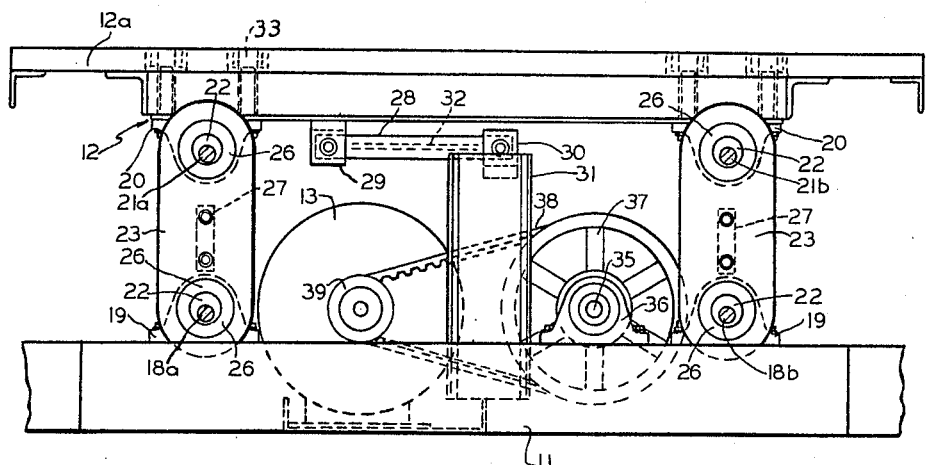
FIGURE 2 is a fragmetary sectional view thereof taken substantially on the line 2—2 of FIGURE 3.

Referring now to FIGURE 2, the lower table shafts 18a and 18b, rotate in phase and, as their eccentrics rise and fall, links 23 are carried up and down. The links 23 are connected to the table through the eccentrics 22 on shafts 21a and 21b so that the upper and lower eccentrics journalled in each link act in series. Upper shafts 21a and 21b, however, are journalled in table 12 and their eccentrics 22 are journalled in the links 23. The resultant effect, when shafts 21a and 21b rotate, is that the shafts themselves are offset or eccentric with respect to link 23 and the rise and fall of their eccentrics result respectively in a fall and rise of the table with respect to the links.

It will be apparent that the phase relation between the eccentrics on the upper and lower table-operating shafts as shown in FIGURE 2 results in an action whereby upper and lower eccentrics cancel out and, although the links move up and down, there is no movement of the table. Links 23 are free to move from side to side.

When carriage 63 is moved to the right or left as viewed in FIGURE 4, the upper and lower shaft eccentrics are moved out of phase with one another. As this phase change approaches 90 degrees the cancellation effected by the eccentrics-in-series in each link 23 becomes less and less, and when the difference in phase between the eccentrics in each link 23-series exceeds 90 degrees the effect is to add the amplitude effected by one eccentric to that effected by the other, maximum amplitude being obtained at a phase difference of 180 degrees.

In a manufactured embodiment of a machine 10, each eccentric 22 is one-quarter inch off-center with respect to its associated shaft. Each eccentric 22, therefore, has a one-half inch maximum throw and the maximum effective change in amplitude in each link-connected series of eccentrics is one inch. With its adjustable speed motor 13, it is capable of testing 400 lb. articles at continuously variable speeds and amplitudes up to one G resultants.

No claim is made to the particular differential arrangement per se shown in FIGURES 4 and 5 since a similar arrangement of parts, using a chain and sprockets instead of the toothed belt and pulleys, is commercially available under the name "Phase-Variator," but the particular arrangement for connecting four synchronously rotable shafts is well suited for use in the machines of the invention.

Figure 6:
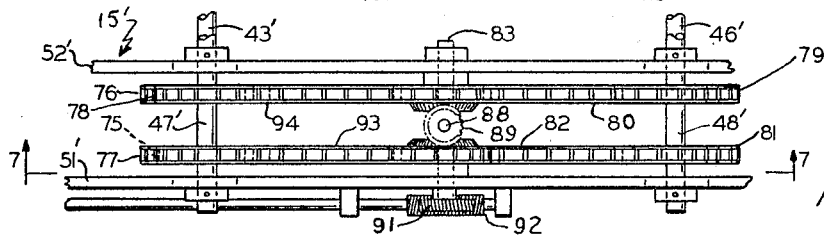
FIGURE 6 is a fragmentary top plan view of a modified form of transmission and differential drive for use in the machine of the invention.
Figure 7:
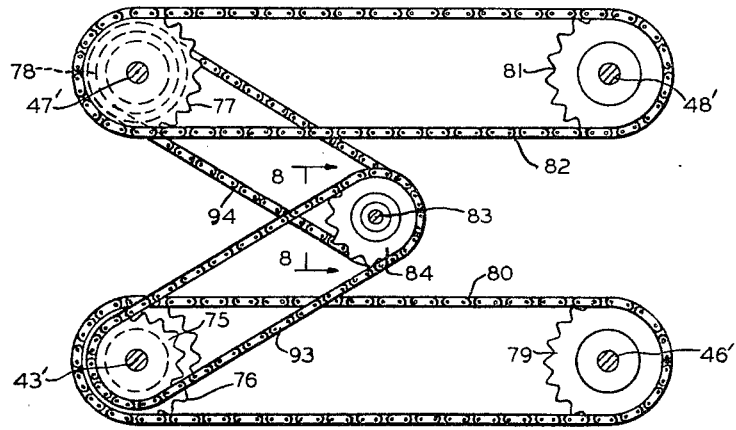
FIGURE 7 is a sectional view on the line 7—7 of FIGURE 6.
Figure 8:
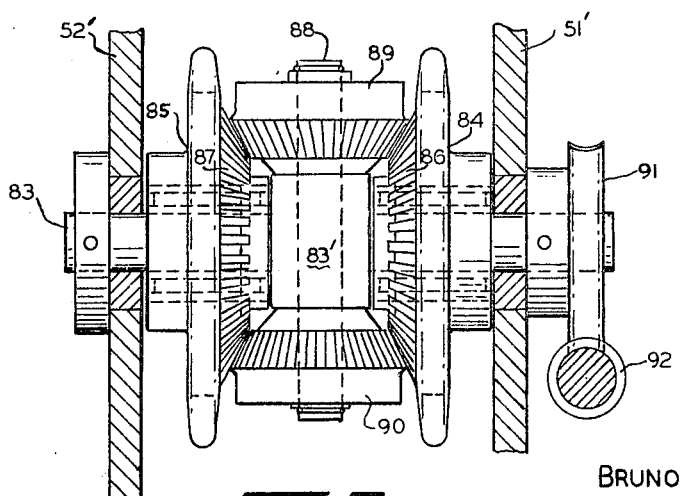
FIGURE 8 is an enlarged fragmentary sectional view on the line 8—8 of FIGURE 7.

FIGURES 6, 7 and 8 show a modified form of transmission and differential for use in a vibration testing machine according to the invention. Mounted in a transmission housing 15' similar to the housing 15 shown in FIGURES 4 and 5, four transmission shafts 43', 46', 47' and 48' are shown journalled in the side plates 51' and 52' of the transmission housing and adapted for connection respectively to shafts 18a, 18b, 21a and 21b of the testing table assembly shown in FIGURES 1–3.

Sprockets 75 and 76 are secured, coaxially side-by-side, on driven shaft 43' between plates 51' and 52'. The upper shaft 47' also has two sprockets 77 and 78 similarly secured thereon. The lower transmission shaft 46' has a sprocket 79 secured thereon in line with sprocket 76, sprockets 76 and 79 being connected by an endless chain 80. The other upper transmission shaft 48' has secured thereon a sprocket 81 in line with sprocket 77, sprockets 77 and 81 being connected by an endless chain 82. The transmission sprockets 76, 77, 79 and 81 are identical.

A differential mechanism, best seen in FIGURE 8, is centered between the four transmission shafts. A rotatable orienting shaft 83 is rotatably secured in side plates 51' and 52', as shown, and has an enlarged portion 83' at its center. Identical sprockets 84 and 85 are rotatably mounted on the reduced portions of shaft 83 between plates 51' and 52', on either side of enlarged portion 83'. Sprockets 84 and 85 are provided, respectively, with inwardly facing bevel gears 86 and 87 secured thereto.

A spider shaft 88 is mounted in the enlarged portion 83', the axis of the spider shaft intersecting that of shaft 83 at right angles. Rotatably secured on the spider shaft are two bevel gears 89 and 90 meshing with gears 86 and 87 in the usual manner of a differential. A worm wheel 91 is secured to one end of shaft 83, and a worm 92 in mesh therewith is rotatably supported on the adjacent side plate 51'.

Sprocket 84 is operably connected by chain 93 to sprocket 75 and sprocket 85 is connected by chain 94 to sprocket 78.

In operation, the wheel 91 is normally held stationary by worm 92. As the driven shaft 43' rotates, chain 80 drives the other lower transmission shaft 46' at the same speed and always in phase with shaft 43'. Sprocket 75 also rotates with shaft 43' and drives sprocket 84 of the differential mechanism through the endless chain 93. The bevel gear 86 secured to sprocket 84 drives the gear 87 on sprocket 85 through gears 89 and 90 carried on spider shaft 88. Sprocket 85 is thus driven at the same speed and in phase with sprocket 84 but in the opposite direction.

Sprocket 85 drives shaft 47' through chain 94 and sprocket 78 in the same reverse direction, and sprocket 77 on shaft 47' drives shaft 48' through chain 82 and sprocket 81 at the same speed in the same direction and in phase with shaft 47'.

By turning the worm 92, wheel 91 is rotated changing the orientation of the spider-born gears 89 and 90 with respect to the bevel gears 86 and 87 and thus changing the phase relation between upper pair of transmission shafts 47' and 48' and lower pair of transmission shafts 43' and 46'. When the four transmission shafts are coupled to the four table-vibrating shafts 18a, 18b, 21a and 21b of a testing machine 10, it will be seen that means have been provided for varying the phase relation between upper and lower shafts while the machine is in operation. By reason of the series connection between link-connected eccentrics, it makes no difference if the upper shafts rotate in the same or opposite direction to that of the lower shafts.

Comparing the differential arrangement shown in FIGURES 6, 7, and 8 with a car differential, the drive sprocket 84 may be equated to one half-axle, driven sprocket 85 to the other half-axle and the orienting mechanism including the spider-born gears 89 and 90 is equated to the car drive shaft and gear thereon.

It will be understood that "differential," as used herein, is used in a limited sense to define mechanism, similar to a motor car "differential" in which a drive member or members, a driven member or members and a third member or members interact to produce differential motion. "Differential" is further limited, as used herein, in that the third member is normally held stationary with respect to the drive and driven members and is moved differentially by "orienting means" only when it is desired to change the phase relation between rotating parts.

Figure 9:
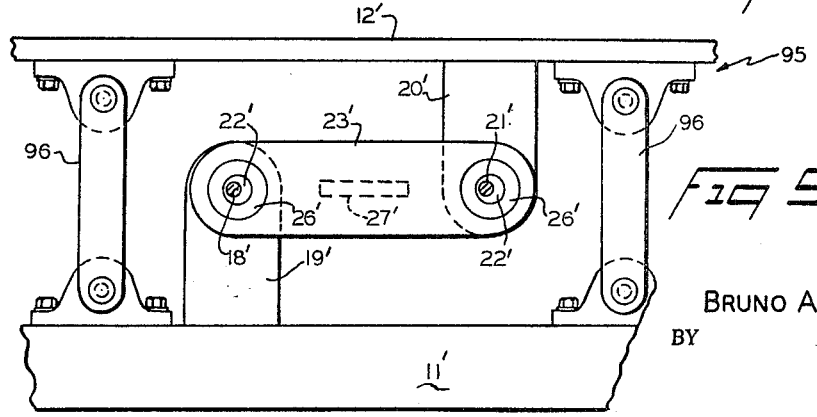
FIGURE 9 is a fragmentary diagrammatic sectional view, similar to that of FIGURE 2, of a modified form of machine arranged for horizontal linear testing.

FIGURE 9 diagrammatically illustrates a modified arrangement 95 of base 11', vibrating table 12', two shafts 18' and 21', eccentrics 22' and links 23' arranged for vibration in a horizontal linear path. Four legs 96 pivotally secured at one end to the base 11' and at the other end to the table 12' conventionally support the table for horizontal reciprocal motion. Table 12' and base 11' are otherwise substantially the same as table 12 and base 11 as shown in FIGURES 1–5.

Shaft 18' extends across base 11' under the table 12' and is journalled under either side of the table in a base supported member 19'. Shaft 21' extends parallel to shaft 18' under table 12' at about the same level as shaft 18', and is journalled in a table supported member 20' at either side of the table.

Shafts 18' and 21' are each provided with a pair of eccentrics 22' and 22', one under each side of the table. A link 23' connects the two shaft eccentrics at the right side of the table (front as viewed in FIGURE 9) and a second link 23' connects the two eccentrics at the left side of the table (rear as viewed in FIGURE 9).

Links 23' are provided with roller bearings 26' in which the shaft eccentrics 22' are journalled and, except for extending in a substantially horizontal rather than vertical direction, are the same as links 23 shown in FIGURES 1–5. A connecting cross-member 27', secured at its ends to the links 23', secures the links together in parallel relationship.

It will be understood that shaft 18' is adapted to be driven at one end by a variable speed motor, not shown, in the manner shown and described in connection with shaft 18a of FIGURES 1–5. Shaft 18' is coupled to one shaft of a differential arrangement, for example, shaft 43 as shown in FIGURES 3, 4 and 5, or shaft 43' as shown in the arrangement of FIGURES 6, 7 and 8. Shaft 21' is adapted to be driven through an appropriate coupling by another shaft of a differential arrangement, for example, shaft 47 or 48 as shown in FIGURES 3, 4 and 5, or by shaft 47' as shown in the arrangement of FIGURES 6, 7 and 8.

There being only two shafts involved in the horizontal vibrating machine 95 of FIGURE 9, the other two shafts of the differential arrangement of FIGURES 3, 4 and 5 become idler shafts. When used with the differential arrangement of FIGURES 6, 7 and 8, shafts 46' and 48', sprockets 76, 77, 79 and 81 and chains 80 and 82 may be omitted.

Figure 10:
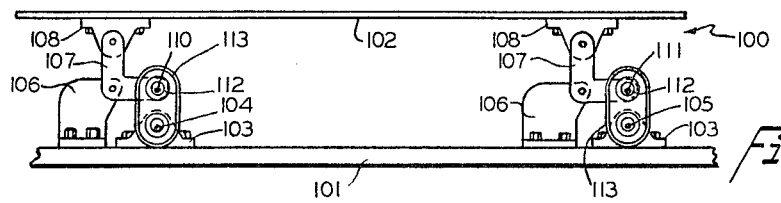
FIGURE 10 is a fragmentary diagrammatic sectional view, similar to that of FIGURE 2, on a smaller scale, of another modified form of machine arranged for horizontal linear testing.

FIGURE 10 diagrammatically illustrates another modification of a testing table 100 arranged for horizontal linear vibration and having a base 101 and a movable table 102. Journal members 103 on base 101 rotatably support the parallel shafts 104 and 105 under opposite ends of the table. Shaft 104 is motor driven by means not shown.

Four support members 106 secured on the base adjacent members 103 pivotally support L-shaped leg members 107, as shown, one end of each leg member being pivotally secured to a pivot support 108 secured to table 102. The other end of each leg member is provided with a suitable journal for rotatably supporting the shafts 110 and 11 substantially directly above the shafts 104 and 105, respectively.

The shafts 104, 105, 110 and 111 are provided with eccentrics 112 as previously described in connection with shafts 18a, 18b, 21a and 21b. These eccentrics are connected for series operation by the links 113 just as previously described in connection with links 23.

Shafts 104, 105, 110 and 111 are coupled to the four transmission shafts of the differential arrangement shown in FIGURES 3, 4 and 5 as previously described in connection with shafts 18a, 18b, 21a and 21b. Alternatively, the four shafts may be coupled to the four transmission shafts of the differential arrangement shown in FIGURES 6, 7 and 8.

The operation of testing table 100, it will be apparent, is similar to that described in connection with the testing machine 10 except that the vertical linear vibrational movement of the shafts 110 and 111 at one end of the leg members 107 is translated at the table-connected ends of the leg members to substantially linear horizontal movement by reason of the pivotal mounting of the leg members on the supports 106.

Shafts 105, 110 and 111 are rotated at the same speed as the motor driven shaft 104 by the transmission mechanism described above. The eccentrics 112 on the upper shafts 110 and 111 rotate always in phase as do the eccentrics on the lower shafts 104 and 105. Regulated by the orienting means of the differential in the transmission mechanism, the phase difference between upper and lower shafts determines the amplitude of vibration effected by the series connected eccentrics journalled in each link 113 and the amplitude may be changed while the shafts are rotating.

Referring again to FIGURE 2, it will be apparent to those familiar with the art that by lengthening the stabilizing links 28 and connecting the ends of the links 28 pivotally to the links 23 at the left end of the table as shown, instead of the clips 29, rotary motion of table 12 will be produced by the modified mechanism and the rotary motion may be changed from elliptical motion to circular motion as the phase relation between upper and lower eccentrics is changed.

It will also be understood that a reciprocating tilting motion may be given to the table 12 of FIGURE 2 by adjusting the eccentrics on shafts 18b and 21b so as to be 180 degrees out of phase with shafts 18a and 21a respectively. Changing the phase relation of the eccentrics on the upper shafts with respect to those on the lower shafts as described in connection with the machine 10 will thereafter modify the amplitude of the tilting motion of the table of the modified machine.

Figure 11:
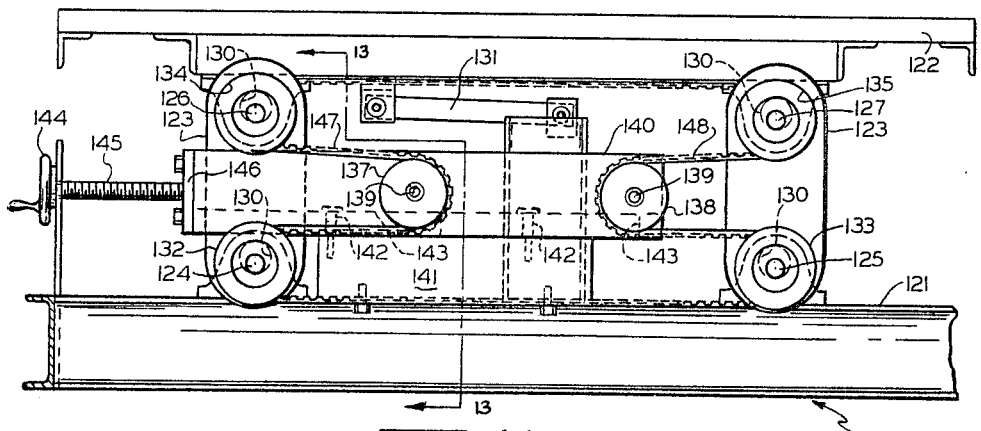
FIGURE 11 is a side elevational view of another modified form of machine arranged for vertical linear testing, with table elevated.
Figure 12:
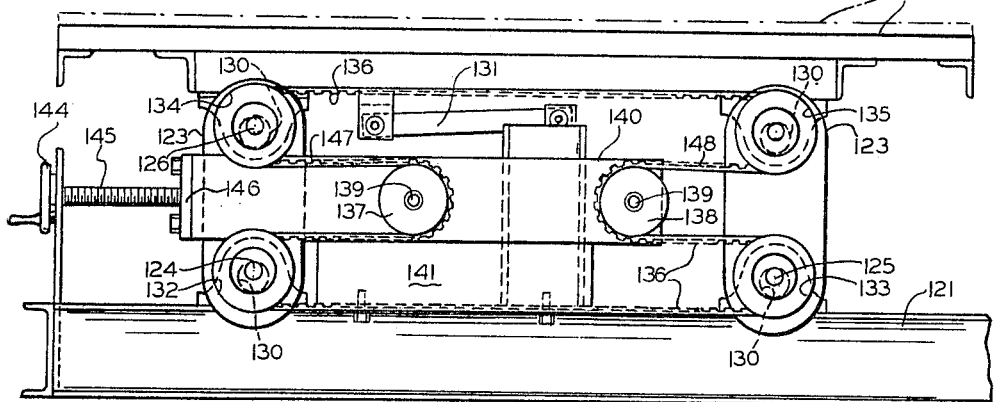
FIGURE 12 is a similar elevational view thereof with table depressed.
Figure 13:
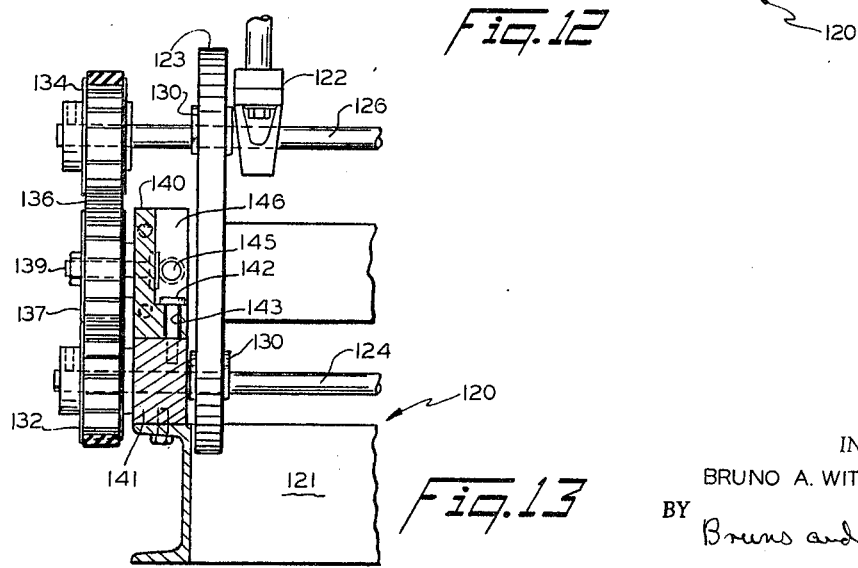
FIGURE 13 is an enlarged fragmentary sectional view on the line 13—13 of FIGURE 12.

In FIGURES 11, 12 and 13 another modification of the testing machine 10 is shown in which economy in the number of parts required is effected by a novel arrangement of the differential means.

The testing machine 120 comprises a base frame 121, a movable table 122, which is constructed like the table 12 of FIGURES 1–5 except as hereinafter noted, the table being supported on legs or links 123, which are in every respect like the links 23 of FIGURES 1–5.

A pair of parallel lower shafts 124, 125 are journalled on the base 121 and a pair of parallel upper shafts 126, 127 are journalled above them in the table 122. Each shaft has a pair of eccentrics 130, 130, pairs of upper and lower eccentrics being journalled in the links 123 under the four corners of the table, as described above in connection with the machine 10. A stabilizing link 131 is provided at each side of the table to guide it in a substantially linear vertical path.

Attached directly to the ends of shafts 124, 125, 126 and 127 are aligned identical toothed pulleys 132, 133, 134 and 135, respectively, and a toothed flexible endless belt 136, engages the pulleys for transmitting rotation simultaneously to all four shafts. Shaft 124 is motor-driven, by means not shown, so that normally the four shafts are driven at the same speed.

Differential means for changing the phase relation between rotating upper shafts with respect to the lower shafts is provided by the differential pulleys 137 and 138 which are mounted on stub shafts 139 secured to a sliding plate 140 mounted on the base. Oppositely and inwardly extending bights in the belt 136 between the upper and lower pulleys pass in reverse curves around the differential pulleys as described in connection with machine 10.

The sliding plate 140 is L-shaped in cross-section as best seen in FIGURE 13 and it is slidably mounted on a block 141 bolted to one of the channel members of base 121, as shown. Headed studs 142 secured in the block 141 and extending through longitudinally extending slots 143 in the horizontal leg of the plate 140 secure the plate on the block 142. A hand wheel 144 and its attached worm 145 threadedly engaged in the nut 146 which secured to the end of the plate 140, provide means for sliding the plate 140 on the block 141 for changing the phase relation between upper and lower shafts as described above.

In FIGURES 11 the table 122 is shown in its most elevated position and in FIGURE 12, the shafts 124, 125, 126 and 127 having turned 180°, the table is shown in its most depressed position. Since shafts 124 and 125 are journalled in the base there is no change in the relative differences in height between pulleys 132 and 133 and the differential pulleys 137 and 138, the latter also being secured to the base. Pulleys 134 and 135, however, oscillate up and down as the shafts turn since they are supported by the journalled connection between the eccentrics 130 and the links 123. The substantially horizontal run 147 of the belt between pulley 134 and differential pulley 137 and the run 148 between differential pulley 138 and pulley 135 vary by a few degrees from an exactly horizontal disposition. Inspection of FIGURES 11 and 12 shows that this deviation from the horizontal is from a small number of degrees deviation in one direction in FIGURE 11 to the same degree of deviation in the other direction in FIGURE 12.

When the maximum amplitude of vibration of table is one inch the throw of eccentrics 30 on the lower shafts is only one quarter of an inch in either direction resulting in a maximum amplitude of vibration of one half inch in links 123 and pulleys 134 and 135. When the differential pulleys are spaced a sufficient distance horizontally from the table-supported pulleys a flexing of the belt 136 of less than two degrees on either side of the horizontal takes place at the junction of the runs 147 and 148 with its respective differential pulley. This flexing results in a stretching of the belt so small as to be negligible, so that the necessity for any flexible couplings is eliminated.

When a phase change between upper and lower shafts is effected by turning handwheel 144 to slide plate 140 to the left in FIGURES 11 and 12, differential pulley 137 approaches pulley 134. At the same time, however, the amplitude of vibration is lessened so that the actual angle of flexing of the belt 136 is not increased. The vertical movement of pulley 134 becomes less as the horizontal distance between pulleys 134 and 137 is lessened.

It will be noted that the necessity for couplings and a separate differential housing has been eliminated in table 120 and, in addition to lessening the number of parts, considerable savings in space is also effected.

Referring again to FIGURES 6 and 7, it will be apparent that a similar arrangement of parts in that differential device may be used to effect similar savings. By locating the shaft 83 substantially on the line between centers of the shafts 47 and 48, a generally horizontal disposition of the chain 94 may be made and changes in the working length of the chain are so small, as shafts 47' and 48' vibrate vertically, as to be well within the limits of the slackness required when any chain extends between two sprockets rotating at high speeds. Any interference between chain 93 and 82 is avoided by spacing these chains axially of the shafts, as for example, by locating chain 82 on the other side of the table.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. Vibration producing mechanism for testing machines, comprising: at least two shafts journalled for independent rotation, each shaft having at least one eccentric portion, drive means for rotating one shaft, and rotation transmission means operably connecting the shafts for synchronous rotation, an eccentric portion of one shaft being mechanically coupled to an eccentric portion of the other shaft for transmitting vibratory linear motion from the rotation of the one shaft to the other shaft, the transmission means including differential means for steplessly changing the phase relation between the coupled eccentric portions of the shaft for varying the amplitude of vibration while both shafts are rotating.

2. In combination, vibration producing mechanism for a testing machine including: at least two members separately mounted for rotation about spaced parallel axes, each member having thereon at least one eccentric portion, link means operably connecting an eccentric portion on one member with an eccentric portion on another member, each eccentric portion being separately journalled in the link means, means for rotating one member, and rotation transmission means operably connecting all the members for synchronous rotation, the transmission means including differential means for changing the phase relation between link-connected eccentric portions for varying the amplitude of vibration.

3. Vibration producing mechanism for testing machines which have a support portion and a vibrating portion, comprising: shafts separately mounted in the support and vibrating portions for rotation about spaced parallel axes, each shaft having thereon at least one eccentric; link means each operably coupling an eccentric on a support mounted shaft with an eccentric on a shaft mounted on the vibrating portion, each eccentric being separately journalled for roation in the link means for connecting the eccentrics in series; motor means for rotating one shaft; and rotation transmission means operably connecting all the shafts for synchronous rotation, the transmission means including at least one rotating drive member, at least one rotating driven member, and at least one third member which is adjustable to produce differential motion between drive and driven members; whereby the phase relation between series-connected eccentrics may be changed while they are rotating by adjustment of the third member.

4. Vibration producing mechanism for testing machines having a stationary base and a table supported for vibratory movement relative to the base, comprising: rotatable members supported on the base and the table respectively; said members having eccentric means thereon; at least one movable link element having the eccentric means of a base supported member journalled in one of its ends and the eccentric means of a table supported member journalled in its other end; motor means for driving one of said rotatable members; transmission drive means operably connected to said motor driven member for rotating all of the rotatable members synchronously whereby said link-connected eccentric means operate in series, the transmission drive means including adjustably positionable means operably connecting the base-supported and table-supported rotatable members, said last-named means being capable of differential motion with respect to said base and table-supported rotatable members and being normally maintained in a predetermined differential orientation in the transmission means; and means for changing the orientation of said adjustably positionable means whereby the phase relation between said link-connected eccentric means can be changed while the rotatable members are rotating.

5. Vibration producing mechanism for testing machines having a stationary base and a table supported for vibratory movement relative to the base, comprising: at least one shaft rotatably supported by the base; at least one other shaft rotatably supported by the table; eccentrics on each shaft; at least one movement transmitting member having an eccentric on a base-supported shaft rotatably mounted in one end and an eccentric on a table-supported shaft rotatably mounted in its other end; drive means for rotating one of said shafts; transmission drive means operably connected to said driven shaft for rotating all the shafts synchronously whereby the eccentrics at either end of each movement transmitting member operate in series, the transmission drive means including differential means between the table-supported and base-supported shafts; and orienting means operable upon said differential means for changing the phase relation between the member-connected eccentrics, whereby the amplitude of vibration resulting from the series operated eccentrics may be changed while the machine is in operation.

6. In a vibration testing machine having a stationary base, a table for supporting articles to be tested, and means connecting said table and base for imparting vibratory motion in a predetermined path to the table, the improvement comprising: said means including rotatable members supported in journals secured on said base and table respectively, said members having eccentrics thereon; at least one link element having a base-supported member eccentric journalled in the element at one of its ends and a table-supported member eccentric journalled in the element at its other end; motor means for driving one of said members; transmission drive means operably interconnecting said members for rotating all of the members at the same speed, said transmission drive means including differential means between the base-supported and table-supported rotatable members; and orienting means operable on the differential means for changing the phase relation between link-connected eccentrics while said rotatable members are rotating.

7. A transportation-simulating vibration testing machine the vibration amplitude of which is continuously adjustable during operation of the machine, comprising: a base, a table, means for guiding the table in a substantially linear path, a motor mounted on the base, a plurality of shafts journalled in said base and table respectively, eccentrics on said shafts, a plurality of link elements, each link element having a base-supported shaft eccentric journalled in one end of the element and a table-supported shaft eccentric journalled in the other end of the element, means driven by the motor for rotating the base-supported shaft eccentrics at the same speed, drive means associated with the motor-driven means and including flexible couplings for rotating the table-supported shaft eccentrics at the same speed, the motor-driven means and the associated drive means being operatively connected by differential means for rotating all the eccentrics at the same speed, and differential orienting means for changing the phase relation between said base-supported shaft eccentrics and said table-supported shaft eccentrics.

8. In a transportation-simulation testing machine having a table adapted for substantially linear vertical vibration, the combination of a base, a motor on the base, a lower pair of parallel shafts journalled in the base, an upper pair of parallel shafts journalled in the table, a pair of aligned eccentrics on each shaft, a substantially vertically extending link element under each of the four corners of the table, each element having a journalled connection with an eccentric on one of the lower shafts at one end of the element and a journalled connection with an eccentric on one of the upper shafts at the other end of the element, means for guiding the table in a substantially linear vertical path, means operably connected to the motor for rotating one of the lower shafts, transmission drive means for rotating the other lower shaft in phase at the same speed with the motor-driven shaft and including flexible couplings for driving the upper shafts in phase at the same speed, the transmission means including differential means for changing the phase relation between upper and lower shafts for varying the amplitude of the table vibration.

9. In a transportation-simulating testing machine having a table adapted for rapid tilting movement about a line across the table, the combination of a base, a motor on the base, a lower pair of parallel shafts journalled in the base, an upper pair of parallel shafts journalled in the table, a pair of aligned eccentrics on each shaft, a substantially vertically extending link element under each of the four corners of the table, each element having a journalled connection with an eccentric on one of the lower shafts at one end of the element and a journalled connection with an eccentric on one of the upper shafts at the other end of the element, aligned pivot means on either side of the table supported by coacting means on the base for guiding the table in its pivotal movement, means operably connected to the motor for rotating one of the lower shafts, transmission drive means for rotating the other lower shaft at the same speed and one half turn out of phase with the motor-driven shaft and including flexible couplings for driving the upper shafts at the same speed, one upper shaft being one half turn out of phase with the other upper shaft, the transmission means including differential means for changing the phase relation between upper and lower shafts for varying the amplitude of the tilting motion of the table.

10. In a testing machine for producing substantially linear vertical vibration the amplitude of which is continuously adjustable, the combination of a base; a motor supported on the base; a movable table for supporting articles to be tested; a lower pair of parallel shafts journalled in said base; an upper pair of parallel shafts journalled in said table; a pair of eccentrics on each shaft; a substantially vertically extending link element under each of the four corners of the table, each element having a journalled connection with an eccentric on one of the base-journalled shafts at one end of the element and a journalled connection with an eccentric on one of the table-journalled shafts at the other end of the element; means for guiding the table in a substantially linear vertical path; means operably connected to said motor for rotating one of said shafts; a transmission housing; a pair of lower transmission shafts journalled in said housing, each lower transmission shaft being coupled to one of said base-journalled shafts; a pair of upper transmission shafts journalled in said housing, each upper transmission shaft having a flexible coupling connection to a respective one of said table-journalled shafts; and transmission means including toothed rotating means secured on each of said transmission shafts and including means interconnecting said toothed rotating means for rotating them at the same speed, said transmission means also including differential means operably connecting said upper pair of transmission shafts to said lower pair of transmission shafts, and means for changing the orientation of said differential means for changing the phase relation between said upper and lower transmission shafts.

11. A testing machine as defined in claim 10 wherein said toothed rotating means on each transmission shaft is a toothed pulley and said interconnecting means is an endless flexible toothed member engaging said toothed pulleys, said differential means including a movable differential carriage slidably mounted in said transmission housing, a pair of roller pulleys rotatably secured on said carriage, said flexible member having an inwardly extending bight between adjacent upper and lower transmission shafts extending in a reverse curve around each of said carriage pulleys, and said orientation changing means includes means for moving said carriage linearly for varying the phase relation between upper and lower transmission shafts.

12. A testing machine as defined in claim 10 wherein said toothed rotating means comprises a sprocket secured on each of said upper and lower transmission shafts; said interconnecting means includes a first endless chain connecting said upper shaft sprockets and a second endless chain connecting said lower shaft sprockets; said differential means includes a second sprocket secured on one each of said upper and lower transmission shafts, an orienting shaft rotatably mounted in said housing, a pair of differential sprockets independently rotatable on said orienting shaft, a third endless chain connecting one of said differential sprockets to one of said second sprockets, a fourth endless chain connecting the other differential sprocket to the other of said second sprockets, a bevel gear coaxially secured to each of said differential sprockets, a spider shaft mounted on said orienting shaft, at least one planetary gear rotatably mounted on the spider shaft in mesh with said bevel gears, and said orientation changing means includes worm and wheel means for rotating the orienting shaft for changing the phase relation between said upper and lower transmission shafts.

13. In a testing machine for producing substantially linear horizontal vibration the amplitude of which is continuously adjustable, the combination of a base; a motor supported on the base; a movable table for supporting articles to be tested; means for supporting said table on the base and for guiding the table in a substantially linear horizontal path; a first shaft rotatably supported by said base; a second shaft rotatably supported by said table substantially level with and parallel to the first shaft; at least one eccentric on each shaft; at least one substantially horizontally extending link element, said element having a journalled connection with an eccentric on said first shaft at one end of the element and a journalled connection with an eccentric on said second shaft at the other end of the element; means operably connected to said motor for rotating said first shaft; means including a differential and a flexible coupling for rotating the second shaft at the same speed as the first shaft; and means for changing the orientation of said differential whereby the phase relation between the first and second shafts may be varied.

14. A testing machine as defined in claim 13 wherein the means for rotating the second shaft at the same speed as the first shaft includes similar sprockets coupled to said first and second shafts respectively; said differential includes an orienting shaft, differential bevel gears independently rotatably mounted on said orienting shaft, at least one planetary gear rotatably carried on said orienting shaft and operatively connecting said bevel gears, a differential sprocket coaxially secured to each of said bevel gears, a first endless chain connecting one of said differential sprockets with one shaft-coupled sprocket, and a second endless chain connecting the other differential sprocket to the other shaft-coupled sprocket; and said means for changing the orientation of said differential includes wheel and worm means for turning said orienting shaft for varying the phase relation between said first and second shafts.

15. A testing machine as defined in claim 13 wherein the means for rotating the second shaft at the same speed as the first shaft includes a transmission housing having spaced side plates, four parallel transmission shafts journalled in the side plates of the housing at four corners thereof, a toothed pulley secured on each shaft between the side plates, one transmission shaft being rotatably connected to said first shaft, and another transmission shaft being rotatably connected to said second shaft, said differential includes a differential carriage slidably mounted between the side plates for movement along a line passing between said rotatably connected transmission shafts, a pair of differential pulleys rotatably secured on said carriage, an endless toothed belt operably connecting said toothed pulleys for rotation at the same speed, a pair of bights in opposite portions of the belt between opposite pairs of transmission shafts, each bight extending toward the other in a direction along the line of movement of the carriage, each bight being engaged around a different one of said differential pulleys; and said means for changing the orientation of said differential includes means for moving the carriage along said line to vary the relative length of the bights to thereby change the phase relation between said first and second shafts.

16. In a vibration testing machine having a stationary base, a table for supporting articles to be tested, and means connecting said table and base for imparting vibratory motion in a predetermined path to the table, the improvement comprising: said vibratory means including rotatable members supported in journals secured on said base and table respectively, said members having eccentrics thereon; at least one link element having a base-supported member eccentric journalled in the element at one of its ends and a table-supported member eccentric journalled in the element at its other end; motor means for driving one of said members; transmission drive means, including toothed belt means operably interconnecting said members, for rotating all of the members at the same speed, said transmission drive means also including differential means between base-supported and table-supported rotatable members; and orienting means operable on the differential means for changing the rotational phase relation between link-connected eccentrics while the members are rotating; the toothed belt means between differential means and table-supported members extending in a direction substantially normal to the path of vibration of the table, whereby stretching of the belt means is minimal.

17. A vibration testing machine, the vibration amplitude of which is continuously adjustable during operation of the machine, comprising: a base, a table; means for guiding the table in a substantially linear path; a motor mounted on the base; a plurality of shafts journalled in said base and table respectively; eccentrics on the shafts; a plurality of link-elements, each link element having a base-supported shaft eccentric journalled in one end of the element and a table-supported shaft eccentric journalled in the other end of the element; means driven by the motor for rotating the base-supported shaft eccentrics at the same speed; differential means supported on the base and having driving and driven portions; means driven by the motor driven means for driving the differential means; means driven by the differential means and including toothed flexible belt means for driving the table-supported shaft eccentrics at the same speed; and orienting means for changing the phase relation between driving and driven portions of the differential means; the differential means being offset from the table-supported shafts in a direction normal to the linear path of the table, whereby stretching of the belt means by eccentric movement of the table-supported shafts with respect to the base supported shafts is minimal.

18. In a testing machine having a table adapted for substantially linear vertical vibration, the combination of a base, a motor on the base, a lower pair of parallel shafts journalled in the base, an upper pair of parallel shafts journalled in the table, a pair of aligned eccentrics on each shaft, a substantially vertically extending link element under each of the four corners of the table, each element having a journalled connection with an eccentric on one of the lower shafts at one end of the element and a journalled connection with an eccentric on one of the upper shafts at the other end of the element, means for guiding the table in a substantially linear vertical path, means operably connected to the motor for rotating one of the lower shafts, toothed transmission drive pulleys secured to each of the shafts, differential means supported on the base for varying the rotational phase relation between the eccentrics on the upper and lower shafts, said differential means having at least two transmission drive pulleys, toothed flexible belt means associated with the pulleys connecting the upper and lower pairs of shafts respectively to rotate in unison and connecting the upper pair of shafts to the lower pair of shafts through the differential means, and orienting means connected to the differential means for changing the rotational phase relation between the upper and lower pairs of shafts, the flexible belt means between the upper pair of shafts and the differential means extending substantially horizontally, whereby stretching of the belt means by changes in the elevation of the upper pair of shafts is minimal.

19. In a testing machine for producing substantially linear vertical vibration the amplitude of which is continuously adjustable, the combination of a base; a motor supported on the base; a movable table for supporting articles to be tested; a lower pair of parallel shafts journalled in the base; an upper pair of parallel shafts journalled in the table; a pair of eccentrics on each shaft; a substantially vertically extending link element under each of the four corners of the table, each element having a journalled connection with an eccentric on one of the base-journalled shafts at one end of the element and a journalled connection with an eccentric on one of the table-journalled shafts at the other end of the element; means for guiding the table in a substantially linear vertical path; means operably connected to said motor for rotating one of said shafts; a differential support slidably mounted on the base for horizontal movement normal to the shaft axis; a pair of differential pulleys rotatably mounted on the differential support; a toothed pulley, aligned with the differential pulleys, secured to the end of each of said shafts; an endless flexible toothed belt around said toothed pulleys, the belt having inwardly extending bights between adjacent upper and lower shafts extending in a reverse curve around each of said differential pulleys, and orientation changing means for moving the differential support horizontally with respect to the base; each run of belt between a differential pulley and a table-supported toothed pulley being substantially horizontal whereby stretching of the belt by vertical oscillation of the link elements is minimal.

References Cited by the Examiner

UNITED STATES PATENTS

| | | | |
|---|---|---|---|
| 1,840,131 | 1/1932 | Riker | 73—71.7 |
| 2,438,756 | 3/1948 | Larsen | 73—71.6 |
| 3,044,292 | 7/1962 | Matthews | 73—71.6 |
| 3,209,582 | 10/1965 | Greenberg et al. | 73—67.8 |

RICHARD C. QUEISSER, *Primary Examiner.*

LAWRENCE R. FRANKLIN, *Assistant Examiner.*